(12) United States Patent
Stratford et al.

(10) Patent No.: US 8,756,905 B2
(45) Date of Patent: Jun. 24, 2014

(54) EDGE GUIDE FOR A MOWER

(75) Inventors: Mark Stratford, Durham (GB); Cavan Grey, Durham (GB); Ian Maddison, Bishop Auckland (GB)

(73) Assignee: Black & Decker Inc., Newark, DE (US)

(*) Notice: Subject to any disclaimer, the term of this patent is extended or adjusted under 35 U.S.C. 154(b) by 0 days.

(21) Appl. No.: 13/449,384

(22) Filed: Apr. 18, 2012

(65) Prior Publication Data

US 2012/0272634 A1 Nov. 1, 2012

(30) Foreign Application Priority Data

Apr. 21, 2011 (EP) .................................. 11163526

(51) Int. Cl.
*A01D 67/00* (2006.01)
*A01D 34/00* (2006.01)
*A01D 34/84* (2006.01)

(52) U.S. Cl.
USPC .......................................... 56/320.1; 56/17.3

(58) Field of Classification Search
USPC .................... 56/119, 320.1, 17.3, 320.2, 255
See application file for complete search history.

(56) References Cited

U.S. PATENT DOCUMENTS

| | | | |
|---|---|---|---|
| 2,504,268 A * | 4/1950 | Lee | 56/255 |
| 2,518,093 A * | 8/1950 | Sutter | 56/17.3 |
| 2,539,779 A * | 1/1951 | Grosso | 56/16.6 |
| 2,557,598 A | 6/1951 | Daggett | |
| 2,659,191 A | 11/1953 | Miller et al. | |
| 2,671,299 A | 3/1954 | Orr | |
| 2,708,818 A * | 5/1955 | Gentry et al. | 56/17.3 |
| 2,864,226 A | 12/1958 | Bright | |
| 2,880,563 A | 4/1959 | Nottmeyer | |
| 2,887,838 A * | 5/1959 | Gudmundsen | 56/17.3 |
| 2,906,082 A * | 9/1959 | Mathis | 56/320.1 |
| 2,926,478 A | 3/1960 | Jepson | |
| 2,934,882 A * | 5/1960 | Kaut, Jr. | 56/320.1 |
| 2,972,849 A | 2/1961 | Ridenour et al. | |
| 3,028,717 A | 4/1962 | West | |
| 3,028,719 A | 4/1962 | Jepson | |
| 3,091,905 A * | 6/1963 | Aiken, Jr. | 56/17.3 |
| 3,136,107 A | 6/1964 | Spear | |
| 3,142,950 A | 8/1964 | West | |
| 3,144,258 A | 8/1964 | Ottosen et al. | |
| 3,190,063 A * | 6/1965 | Epstein | 56/255 |
| 3,197,951 A | 8/1965 | Zick | |
| 3,230,695 A | 1/1966 | West | |

(Continued)

FOREIGN PATENT DOCUMENTS

| | | |
|---|---|---|
| DE | 19706592 | 7/1998 |
| EP | 1632127 | 6/2008 |

*Primary Examiner* — Thomas B Will
*Assistant Examiner* — Joan D Misa
(74) *Attorney, Agent, or Firm* — John Yun

(57) ABSTRACT

A mower comprising an edge guide located adjacent an outer surface of a side wall and at least partially surrounding an opening. The edge guide comprises an inlet and is arranged to guide vegetation towards the opening. The edge guide defines a channel having at least one direction change between the inlet and the opening such that there is no line of sight between the inlet and the cutter element. By providing an edge guide having a convoluted path or channel, an opening in the side wall of the cutter housing can extend vertically up to the plane of the cutter element while still providing a radially-enclosed cutter element as required by safety regulations. Therefore, edge-located vegetation can be fed to the cutter in a more upright configuration for improved cutting.

15 Claims, 6 Drawing Sheets

(56) References Cited

U.S. PATENT DOCUMENTS

| | | |
|---|---|---|
| 3,298,163 A | 1/1967 | Ottosen et al. |
| 3,665,693 A * | 5/1972 | Dacus et al. ............ 56/320.1 |
| 3,680,294 A * | 8/1972 | Dacus et al. ............ 56/255 |
| 3,839,851 A | 10/1974 | Misenko |
| 4,037,396 A * | 7/1977 | Buchele et al. .......... 56/255 |
| 4,272,949 A | 6/1981 | Franks et al. |
| 4,364,221 A | 12/1982 | Wixom |
| 4,466,235 A | 8/1984 | Cole |
| 4,817,372 A | 4/1989 | Toda et al. |
| 4,854,115 A | 8/1989 | Jones et al. |
| 5,325,657 A | 7/1994 | Bevis |
| 7,603,838 B1 | 10/2009 | Henley, Jr. |
| 2003/0182913 A1 | 10/2003 | Wittschen |
| 2006/0070367 A1 | 4/2006 | Coussins et al. |

* cited by examiner

PRIOR ART

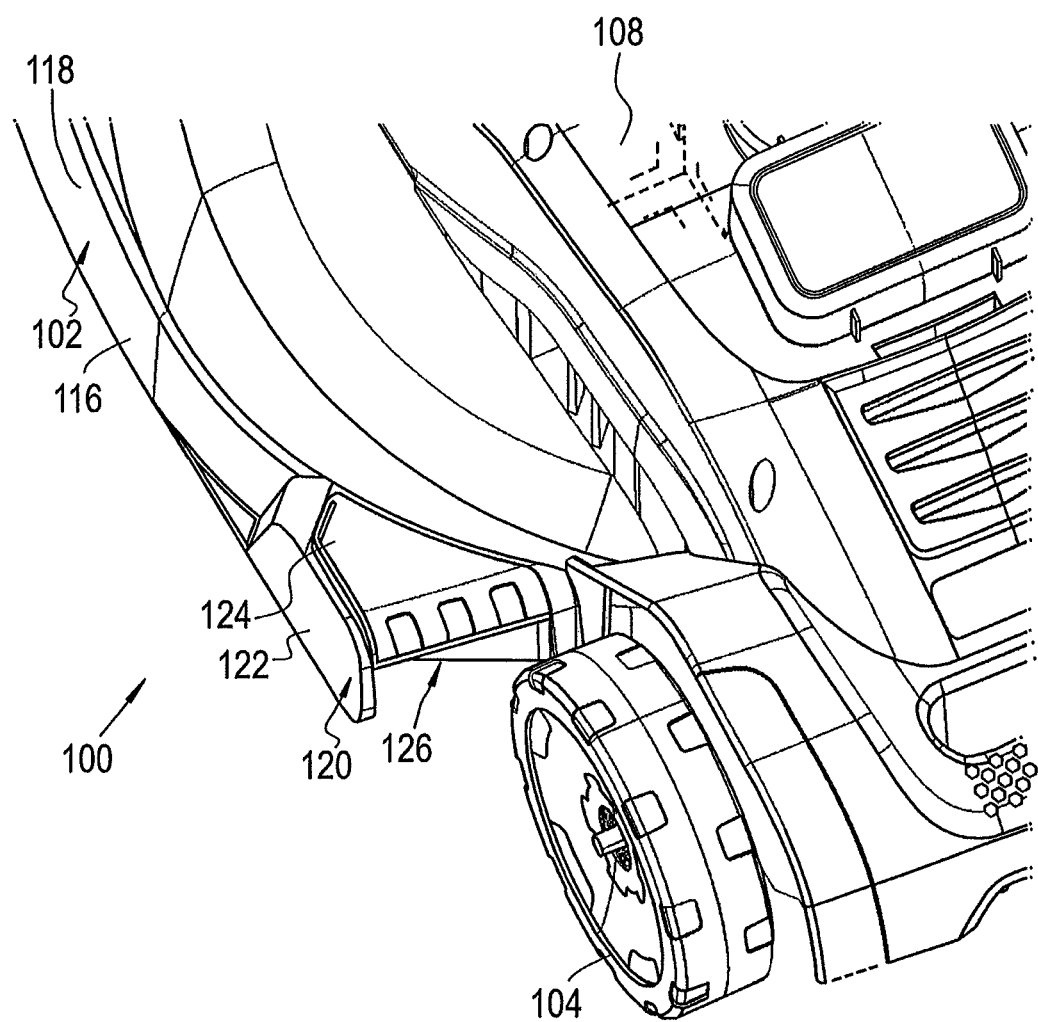

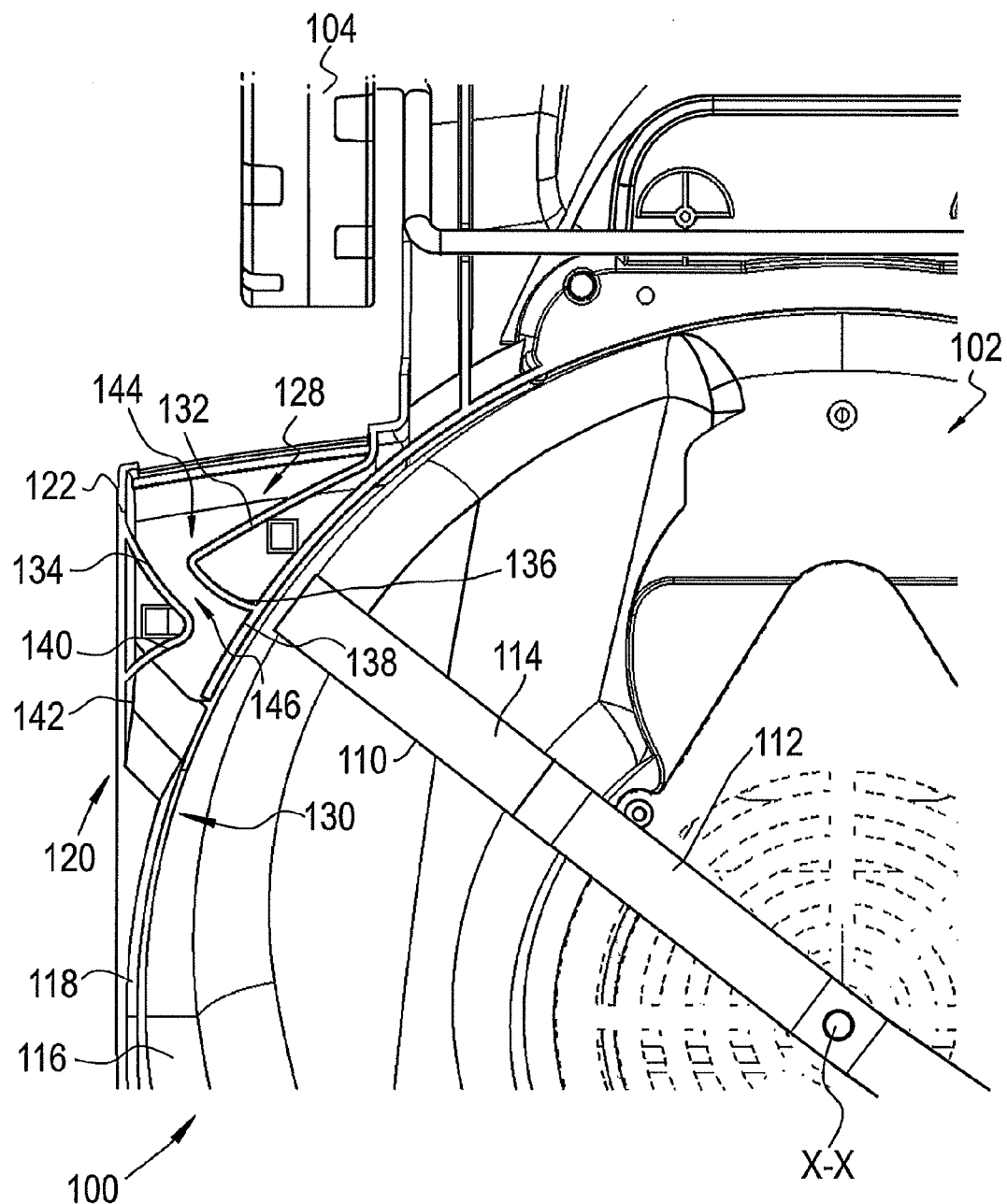

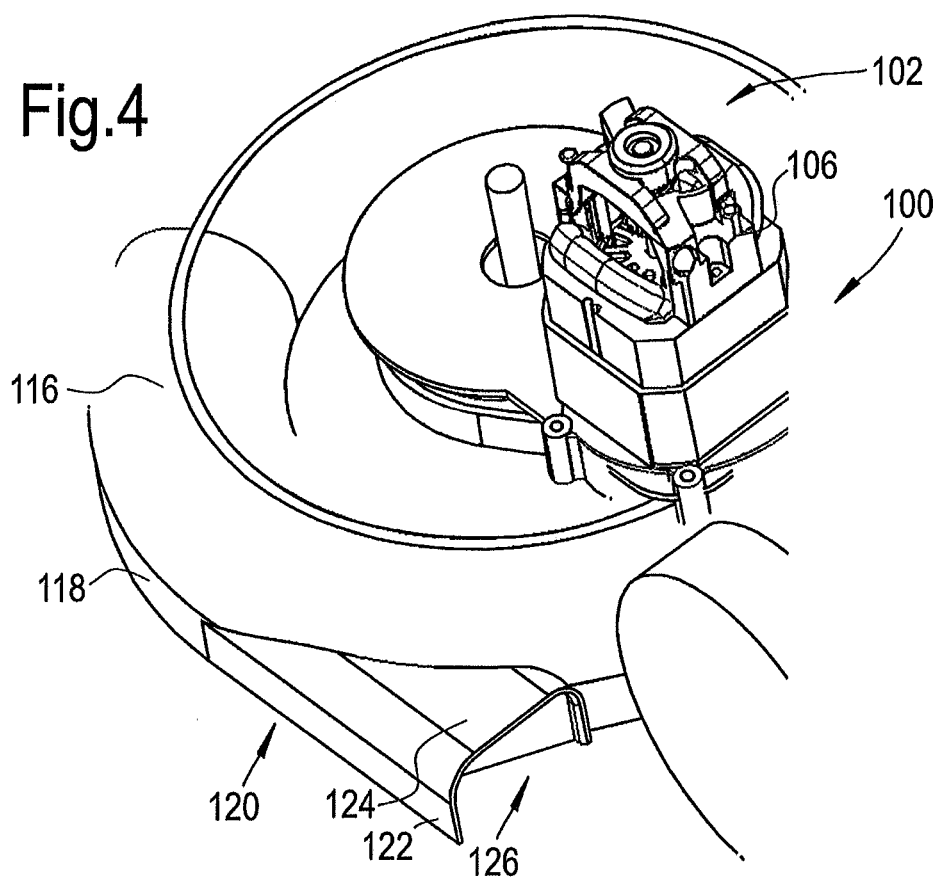
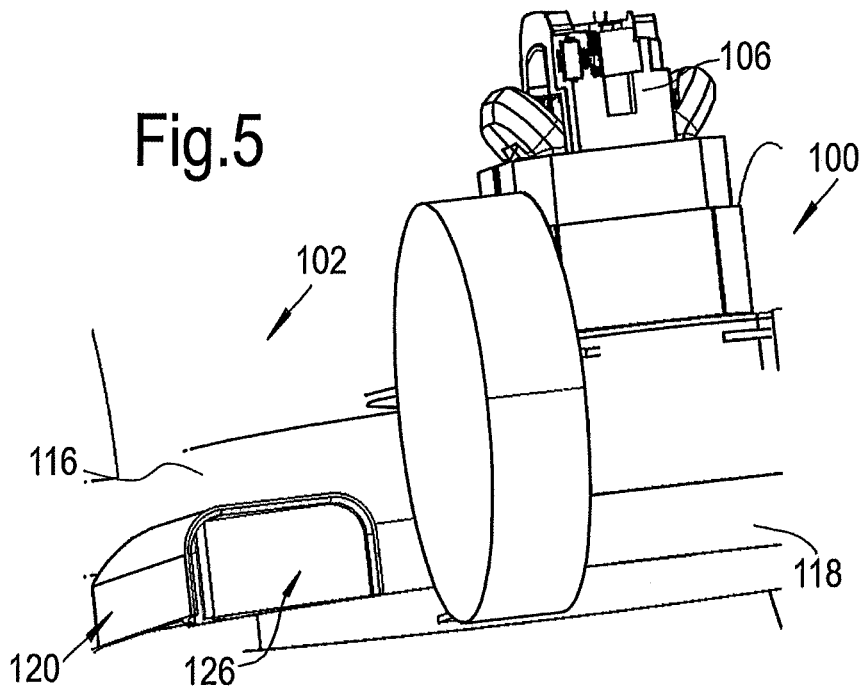

EDGE GUIDE FOR A MOWER

BACKGROUND OF THE INVENTION

The present invention relates to a mower. More particularly, the present invention relates to a mower comprising an edge guide.

Commonly, domestic lawn mowers comprise a cutting deck and a rotatable cutting element (such as a blade or length of cord) located below the cutting deck. The cutting element is operable to rotate about a substantially vertical axis in order to cut vegetation (such as grass) beneath the cutting deck. The blade is driven by means of a motor generally mounted above the cutting deck. The cutting deck is commonly mounted on wheels or rollers to enable the mower to be easily moved across a vegetated surface.

For safety purposes, the cutting element is partially enclosed by a housing which surrounds the upper surface and sides of the cutting element to prevent accidental contact between the cutting element and, for example, a user of the mower or items in a garden environment other than vegetation to be cut. Current safety regulation standards in Europe for lawn mower construction require that the side walls of the housing extend at least 3 mm below the plane of the cutting element and that there must be no direct line of sight from externally of the mower to the cutting element in the plane of the blade.

However, this arrangement can be problematic when cutting vegetation growing at, for example, edges of a garden close to a structure such as a fence or wall. This is because, due to the requirement for the cutting element to be partially enclosed, the side walls of the housing must necessarily be spaced from the radially-outermost portion of the cutting element to prevent contact of the cutting element on the housing.

Therefore, in practice, the cutting element cannot extend far enough radially outward to cut the vegetation adjacent the structure due to the required clearance between the cutting element and the side wall of the cutting deck. Furthermore, it is not possible to remove a part of the side wall of the housing to expose the blade for edge cutting without contravening the safety regulations.

Known attempts have been made to overcome these issues. U.S. Pat. No. 3,839,851 relates to a grass guide for a lawn mower. The grass guide comprises a curved deflector which is fitted to vertical side wall of the cutting deck of a lawn mower and which is operable to deflect grass growing adjacent a structure inwardly of the mower housing where it may be cut by a rotating blade of the lawnmower.

EP 1 632 127 B relates to a lawn mower having a vegetation guide provided on an outside edge of the side of the lawn mower body. The vegetation guide is arranged to deflect vegetation towards a cutting blade of the lawn mower.

As set out above, each of the above-disclosed arrangements suffer from the technical problem that, while the respective guides act to deflect vegetation inwardly towards the cutting blade, the vegetation is subsequently pushed over and flattened by the lowermost edge of the side wall of the cutting deck. In most cases, this wall extends below the cutting plane of the blade. Therefore, the vegetation may ultimately be flattened such that it cannot be cut by the blade when the blade passes thereover. An attempt to alleviate this problem by removing a portion of the side wall of the lawn mower body has been proposed. However, such an arrangement cannot meet the necessary safety regulations.

As a result, there is a need in the art to provide a lawn mower operable to cut edge-located vegetation efficiently while still meeting the necessary safety regulations to ensure safe and reliable operation.

SUMMARY OF THE INVENTION

According to an aspect of the present invention, there is provided a mower comprising a cutter housing arranged to enclose partially a cutter element having a cutting plane, the cutter housing comprising a side wall which extends below the cutting plane, the side wall having an opening formed therein which extends from a base of the side wall to at least the level of the cutting plane, the mower further comprising at least one edge guide located adjacent an outer surface of the side wall and at least partially surrounding the opening, the edge guide comprising an inlet and being arranged, in use, to guide vegetation towards the opening, wherein the edge guide defines a channel having at least one direction change between the inlet and the opening such that, in use, there is no line of sight between the inlet and the cutter element.

By providing such an arrangement, vegetation located adjacent a structure such as a fence or a wall can be cut efficiently in a lawn mowing operation. By providing an edge guide having a convoluted path or channel, an opening in the side wall of the cutter housing can be provided which extends vertically up to (or beyond) the plane of the cutter element (such as a blade) while still providing a fully radially-enclosed cutter element with no line of sight between the inlet to the edge guide and the cutting element as required by safety regulations. Therefore, edge-located vegetation can be fed to the cutter in a more upright configuration for improved cutting.

BRIEF DESCRIPTION OF THE DRAWINGS

The present invention will now be described in detail with reference to the accompanying drawings, in which:

FIG. 2 is a perspective view of a mower edge guide according to the present invention;

FIG. 3 is an underneath view of FIG. 2;

FIG. 4 is a schematic view of the mower of FIG. 2 showing the motor;

FIG. 5 is a schematic front view of the mower of FIG. 2;

DETAILED DESCRIPTION OF THE INVENTION

The present invention provides a mower which is operable to efficiently cut vegetation located adjacent a structure such as a fence or a wall. This is achieved through provision of an edge guide which enables edge-located vegetation to be fed to a cutter element in a more upright configuration for improved cutting while still meeting the required safety standards.

Figure 1:
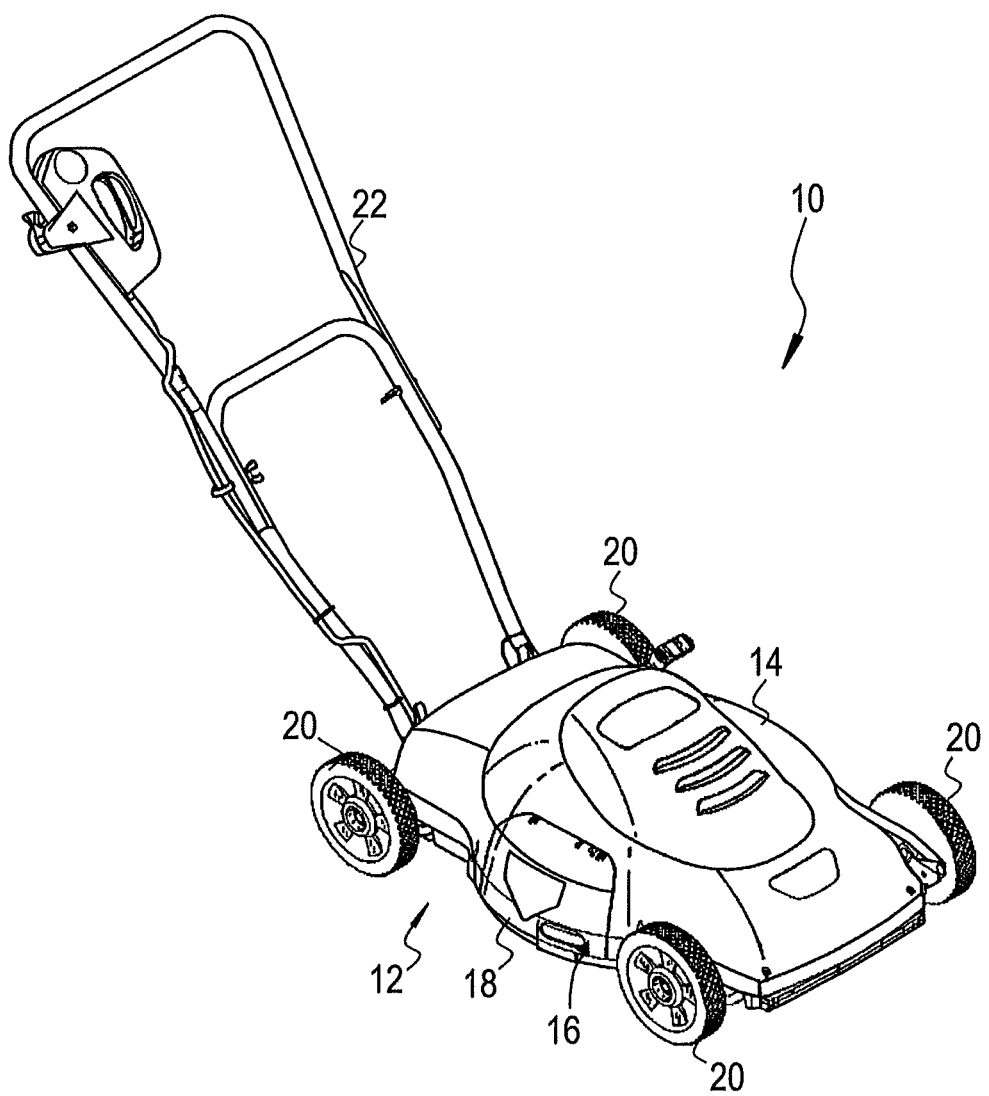
FIG. 1 is a perspective view showing the general configuration of a known mower.

The general configuration of a known mower will now be described with reference to FIG. 1. FIG. 1 shows a perspective view of a mower 10 which comprises a body or cutting deck 12 upon which a motor (not shown) is located. The motor may be in the form of an internal combustion engine or an electric motor powered by either a mains electricity supply or a battery. The motor is located underneath a protective cover 14.

The cutting deck 12 includes a housing 16 comprising side walls 18 which define a cutter enclosure. A cutting element (not shown) such as a blade or length of cord is located within the cutter enclosure. The cutting element is rotatable about a substantially vertical axis and is operable to cut a vegetated surface beneath the mower 10.

The mower 10 further comprises a plurality of spaced-apart wheels 20 which enable the mower 10 to be manipulated on a vegetated surface such as a lawn. The wheels 20 also define the height of the cutting deck 12 above the surface to be cut. A handle 22 is further provided to enable a user to manipulate the mower 10 across a vegetated surface. The handle 22 may additionally comprise controls for controlling the mower 10.

FIGS. 2 to 8 show a mower 100, similar to that shown in FIG. 1, but including an edge guide of the present invention. FIG. 2 shows a perspective view and FIG. 3 shows an underside view of the mower 100. FIGS. 4 to 8 show schematics of parts of the mower 100 removed from the remainder of the mower 100 for clarity.

Referring to FIGS. 2 and 3, the mower 100 comprises a body or cutting deck 102 supported on a plurality of wheels 104 (only one of which is shown in FIGS. 2 and 3). A motor 106 (shown schematically in FIGS. 4 and 5) is located above the cutting deck 102 and covered by a protective cover 108. The motor 106 is operable to drive a cutter element 110 located below the cutting deck 102.

The cutter element 110 is rotatable about a substantially vertical axis X-X (FIGS. 3 and 7) and comprises, in this embodiment, a blade 110 having an inner portion 112 and outer portions 114. The inner and outer portions 112, 114 of the blade 110 rotate in vertically-offset planes (this can be seen best in FIG. 7), with the outer portion 114 rotating in a plane P (FIG. 7) which is located closer to the vegetated surface than the corresponding plane of the inner portion 112. When in use, the blade 110 will sweep out a circular path, with the outer portions 114 sweeping out a path in the plane P.

The cutting deck 102 comprises a cutter housing 116 located at a lower portion thereof. The cutter housing 116 partially encloses the blade 110 and takes the form of an inverted bowl-shaped cutting enclosure comprising an annular side wall 118 which extends around the perimeter of the cutting enclosure. The annular side wall 118 radially encloses the blade 110 and extends below the lowest plane P of the blade 110. In a preferred embodiment, the side wall 118 extends at least 3 mm beyond the plane P to meet current safety requirements and reduce the risk of accidental injury, but any distance is within the scope of the invention.

An edge guide 120 is located adjacent the perimeter of the annular side wall 118 and extends tangentially forwards (with respect to the forward direction of travel of the mower 100) therefrom. While only one edge guide 120 is shown in FIGS. 2 and 3, an edge guide 120 may be provided on each side of the mower 100. The edge guide 120 is operable to guide vegetation located close to a structure (such as, for example, a fence or wall) into the cutter housing 116 to be cut by the blade 110. Absent the edge guide 120, vegetation located close to a structure would either be flattened by the side wall 118 or not be cut at all by the blade 110.

The edge guide 120 projects tangentially forwards from the widest portion of the annular wall 118. The edge guide 120 comprises an external side wall 122 located substantially parallel to the forward direction of travel of the mower 100 and an external top wall 124. The external walls 122, 124 define an edge inlet 126 into which, in use, vegetation close to a structure will be guided as the mower 100 is moved along a surface.

The external walls 122, 124 define a channel 128 within the edge guide 120. The channel 128 is enclosed on three sides and is open at the base to admit vegetation. As shown, the edge guide 120 extends further laterally than other parts of the mower 100 forwardly thereof (such as the front wheel 104) so that vegetation adjacent a structure can be accessed unimpeded. In other words, the external wall 122 is laterally spaced further from the axis X-X than other parts of the mower 100 forwardly thereof.

Figure 6:
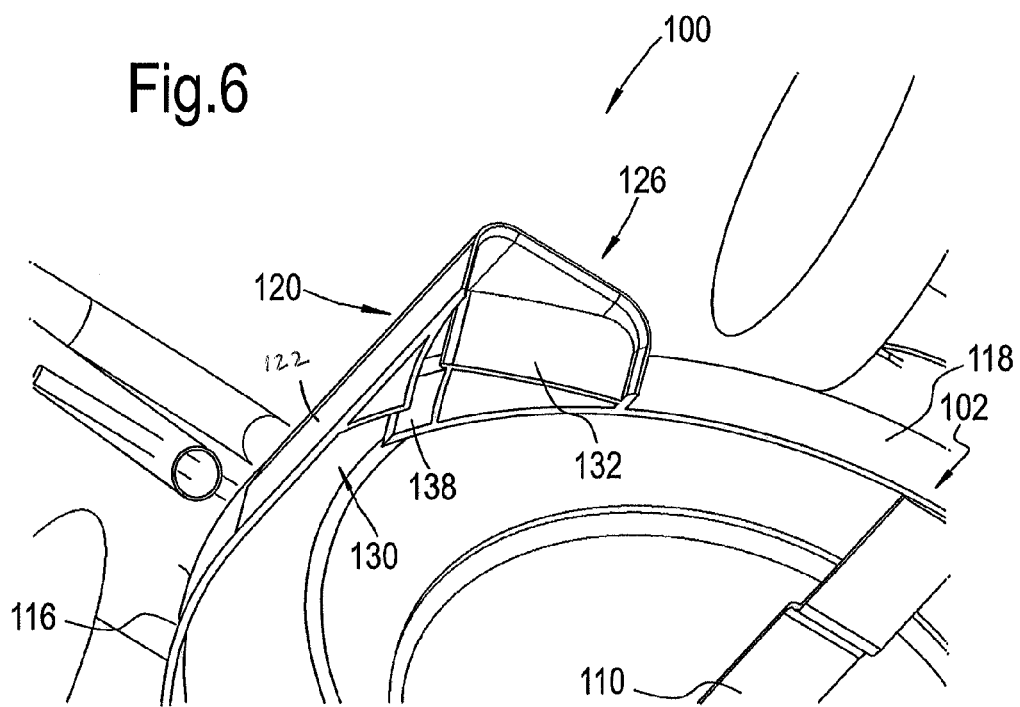
FIG. 6 is a schematic bottom view of the mower of FIG. 2.
Figure 7:
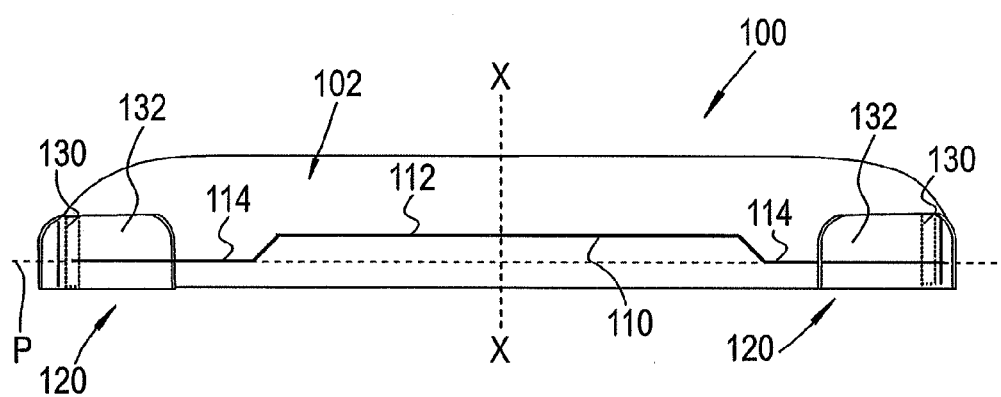
FIG. 7 is a schematic cut-away view of a cutter housing, cutter element and edge guides of the mower of FIG. 2.

An opening 130 is formed in a portion of the annular wall 118 at the proximal end of the edge guide 120 where it meets the outer edge of a portion of the annular wall 118. As shown in FIG. 6, the opening 130 extends from the base of the annular wall 118 (i.e. from a position below the plane P of the blade 110) to a position above the plane P of the blade 110. In this embodiment, the opening 130 extends to meet the lower edge of the external top wall 124. The opening 130 provides a communication path between the edge inlet 126 and the interior of the cutter housing 116 through the interior of the edge guide 120.

Figure 8:
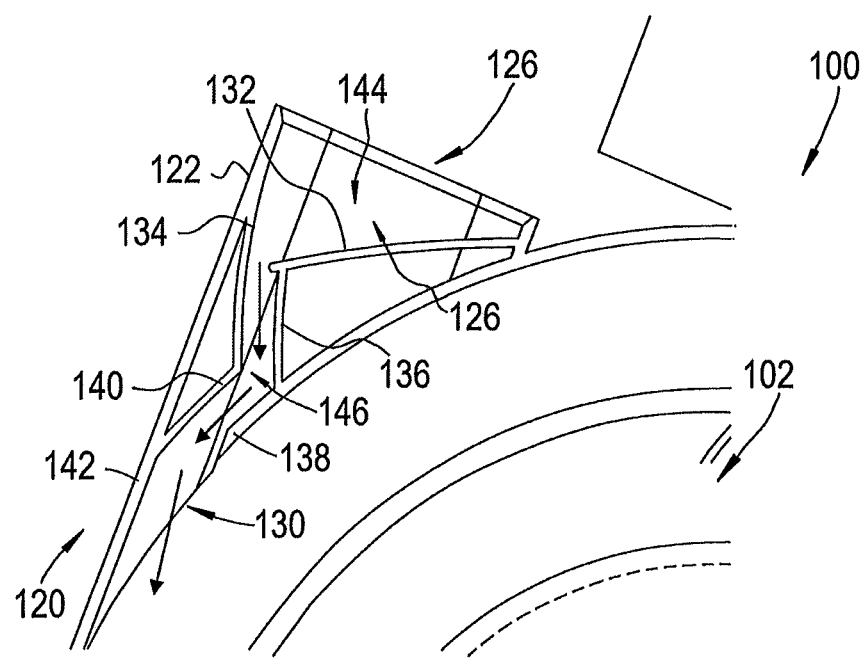
FIG. 8 is schematic bottom view showing edge guides of the mower of FIG. 2.

As best shown in FIGS. 3, 6 and 8, the channel 128 through the interior of the edge guide 120 is delimited by internal walls 132, 134, 136, 138, 140, 142. The internal walls 132, 134, 136, 138, 140, 142 define a convoluted path or channel between the edge inlet 126 and the opening 130. In other words, the internal walls 130, 132, 134, 136, 138, 140, 142 are arranged such that, when viewed in a direction substantially along the plane P of the blade 110, the distal ends of walls 132 and 134 overlap such that the blade 110 is fully radially enclosed and there is no direct line of sight through the edge inlet 126 to the blade 110.

The walls 132, 134 delimit a laterally-tapering first portion 144 of the channel 128 which narrows from the width of the edge inlet 126 to the width of a narrow, laterally-torturous second portion 146 of the channel 128 downstream of the first portion 144. The first portion 144, while tapering, has a general direction which is laterally away from the axis X-X.

The second portion 146 of the channel 128 is delimited by walls 134, 136, 138, 140 and 142. The second portion 146 of the channel 128 has two lateral direction changes before the second portion 146 meets the opening 130.

The walls 134 and 136 are arranged to direct the second portion 146 of the channel 128 in a first lateral direction towards the axis X-X. The walls 138 and 140 downstream of walls 134, 136 are arranged to direct the second portion 146 in a second lateral direction away from the axis X-X and wall 142 (essentially the interior of exterior wall 122) further downstream is arranged to direct the second portion 146 of the channel 128 in a third lateral direction towards the axis X-X, the opening 130 and into the cutter housing 116.

The above-described embodiment enables vegetation located adjacent a structure such as a fence or wall to be cut efficiently in a lawn mowing operation. By providing an edge guide 120 having a convoluted path or channel, an opening 130 in the annular wall 118 of the cutter housing 116 can be provided which extends vertically up to (or beyond) the plane P of the blade 110 while still providing a fully radially-enclosed blade 110 (with no direct line of sight to the blade through the inlet 126) as required by safety regulations.

Therefore, edge-located vegetation the can be fed to the blade 110 in a more upright configuration for improved cutting. This is in contrast to known arrangements which tend to flatten such vegetation, reducing the likelihood of the vegetation being efficiently cut by a rotary blade.

In use, the motor 106 is operable to drive the blade 110 about the axis X-X such that the blade 110 sweeps out a circular cutting path in the plane P. The height of the plane P above the vegetated surface is, in general, dependent upon the height of the cutting deck 102 above the vegetated surface and can be set by a user.

The mower 100 can then be manipulated across the vegetated surface (such as a lawn) by a user to cut the vegetation thereon. Should it be desired to cut vegetation adjacent a structure (e.g. a substantially vertical structure such as a fence or a wall), then the mower 100 is placed such that the edge guide 120 on the respective side of the mower 100 substantially abuts the structure. The mower 100 can then be pushed forwardly such that the inlet 126 moves over the edge-located vegetation (such as grass) and the edge-located vegetation is caused to pass into the inlet 126.

As the mower 100 is pushed forwardly, the edge-located vegetation is channelled by the first portion 144 of the channel 128 into the narrower, torturous second portion 146 of the channel 128. Once the vegetation is inside the second portion 146, continued forward motion of the mower 100 will cause the vegetation to be guided in a first lateral direction towards the axis X-X by walls 134 and 136, then in a second lateral direction away from the axis X-X by walls 138 and 140 and, finally, back towards the axis X-X by the wall 142 (which is, essentially, the inner surface of the external wall 122) and through the opening 130 to the blade 110 where the vegetation will be cut.

This method enables the edge-located vegetation to be guided, during a mowing operation, from the inlet 126, through the channel 128 and the opening 130 and into the cutter housing 116 while being maintained in a configuration such that at least the portion of the vegetation at or below the plane P of the blade 110 remains substantially upright. This enables the blade 110 to cut the edge-located vegetation more cleanly and efficiently than known arrangements which tend to flatten the vegetation.

Variations of the above embodiments will be apparent to the skilled person. The precise configuration of components may differ and still fall within the scope of the present invention.

For example, any suitable cutter element may be used. While the above-described embodiment relates to a cutter blade, a string, wire or other cutter element would fall within the scope of the present invention.

While only one edge guide is shown in the attached figures, it is contemplated that an edge guide will be located on each side of the mower.

While an edge guide having a convoluted path comprising two or more direction changes is shown and described, the skilled person would readily be aware of alternatives. For example, an edge guide having only a single direction change is practicable provided that the guide prevents a direct line of sight between the inlet and the cutting element. The single direction change may be in the form of a curved path, or a straight path at an angle to the inlet path. Alternatively, the direction change may comprise a compound curve with a varying radius of curvature.

While the present embodiment has been illustrated with reference to a domestic lawn mower, it is to be understood that the present invention is applicable to other types of mower; for example, industrial lawn mowers or grass cutters, ride-on lawn mowers or grass cutters or other types of vegetation cutter.

Embodiments of the present invention have been described with particular reference to the examples illustrated. While specific examples are shown in the drawings and are herein described in detail, it should be understood, however, that the drawings and detailed description are not intended to limit the invention to the particular form disclosed. It will be appreciated that variations and modifications may be made to the examples described within the scope of the present invention.

The invention claimed is:

1. A mower comprising a cutter housing arranged to enclose partially a cutter element having a cutting plane, the cutter housing comprising a side wall which extends below the cutting plane, the side wall having an opening formed therein which extends from a base of the side wall to at least the level of the cutting plane, the mower further comprising at least one edge guide located adjacent an outer surface of the side wall and at least partially surrounding the opening, the edge guide comprising an inlet and being arranged, in use, to guide vegetation towards the opening, wherein the edge guide defines a channel having at least one direction change between the inlet and the opening such that, in use, there is no line of sight between the inlet and the cutter element.

2. A mower according to claim 1, wherein the opening extends to a position above the cutting plane.

3. A mower according to claim 2, wherein the channel extends above the level of the cutting plane.

4. A mower according to claim 3, wherein the inlet extends above the level of the cutting plane.

5. A mower according to claim 4, wherein the at least one direction change is in the cutting plane.

6. A mower comprising a cutter housing arranged to enclose partially a cutter element having a cutting plane, the cutter housing comprising a side wall which extends below the cutting plane, the side wall having an opening formed therein which extends from a base of the side wall to at least the level of the cutting plane;
the mower further comprising at least one edge guide located adjacent an outer surface of the side wall and at least partially surrounding the opening, the edge guide comprising an inlet and being arranged, in use, to guide vegetation towards the opening, wherein the edge guide defines a convoluted channel with at least two direction changes between the inlet and the opening such that there is no line of sight between the inlet and the cutter element.

7. A mower according to 6, wherein the edge guide comprises a plurality of inner walls located at an angle to one another to define the convoluted channel.

8. A mower according to claim 7, wherein at least a part of some of the inner walls on opposing sides of the channel overlap one another when viewed in a direction from the inlet to the interior of the cutter housing along the plane of the cutter element.

9. A mower according to claim 8, wherein a tapered channel portion is provided upstream of the channel between the inlet and the channel.

10. A mower according to claim 9, wherein the edge guide has an outer wall which is substantially parallel to the direction of travel of the mower when in use.

11. A mower according to claim 10, wherein the outer wall extends tangentially forwards from the side wall of the cutter housing relative to the forward direction of travel of the mower when in use.

12. A mower according to claim 11, wherein the channel is substantially open at a lower end.

13. A mower according to claim 12, wherein the at least one edge guide comprises two edge guides on opposite sides of the mower.

14. A mower according to claim 13, wherein the edge guides extend further laterally than the remainder of the mower.

15. A mower according to claim 14, further comprising a cutting deck supported on wheels.

* * * * *